United States Patent
Anikitchev et al.

(10) Patent No.: US 6,919,990 B2
(45) Date of Patent: Jul. 19, 2005

(54) METHODS AND SYSTEMS FOR LOW LOSS SEPARATION AND COMBINATION OF LIGHT

(75) Inventors: Serguei G. Anikitchev, Oro Valley, AZ (US); Steven Read, Mississauga (CA); Graham H. Moss, Oldham (GB)

(73) Assignee: IMAX Corporation, Ontario (CA)

( * ) Notice: Subject to any disclaimer, the term of this patent is extended or adjusted under 35 U.S.C. 154(b) by 0 days.

(21) Appl. No.: 10/258,995

(22) PCT Filed: Apr. 18, 2001

(86) PCT No.: PCT/US01/12613
§ 371 (c)(1),
(2), (4) Date: Jul. 17, 2003

(87) PCT Pub. No.: WO01/80555
PCT Pub. Date: Oct. 25, 2001

(65) Prior Publication Data
US 2004/0066557 A1 Apr. 8, 2004
(Under 37 CFR 1.47)

Related U.S. Application Data
(60) Provisional application No. 60/198,614, filed on Apr. 20, 2000.

(30) Foreign Application Priority Data
Apr. 18, 2000 (GB) ............................................. 0009590

(51) Int. Cl.⁷ ........................ G02B 27/10; G02B 27/14; G09G 3/14; G03B 21/00
(52) U.S. Cl. ....................... 359/618; 359/629; 359/634; 359/636; 345/39; 353/31
(58) Field of Search ................. 359/618, 629, 359/634, 636, 638, 640, 487, 462, 464, 466, 472, 583, 589, 722; 385/34; 345/84, 38, 39, 77, 81; 348/97, 741, 743; 353/7, 8, 31, 33, 34, 81

(56) References Cited

U.S. PATENT DOCUMENTS

| | | | |
|---|---|---|---|
| 3,909,525 A | 9/1975 | Fagan | |
| 4,638,309 A | * 1/1987 | Ott | ............................. 345/84 |
| 4,843,381 A | 6/1989 | Baron | |

(Continued)

FOREIGN PATENT DOCUMENTS

| | | |
|---|---|---|
| CA | 2227920 | 7/1999 |
| EP | 0139 991 | 5/1985 |
| EP | 0 606 162 | 7/1994 |

(Continued)

OTHER PUBLICATIONS

Patent Abstracts of Japan, vol. 1999, No. 03, Mar. 31, 1999 & JP 10 319500 A (Fujitsu General Ltd.) Dec. 4, 1998.

(Continued)

Primary Examiner—Georgia Epps
Assistant Examiner—Jack Dinh
(74) Attorney, Agent, or Firm—Kilpatrick Stockton LLP (57) ABSTRACT

A display system is disclosed that includes a light source, an integrator rod receiving a light beam from the light source and producing an integrated light beam, a beam splitting device splitting the integrated light beam into at least a first cone of light and a second cone of light, the cones of light having complementary intensity distributions, and at least a first spatial light modulator and a second spatial light modulator, wherein the first spatial light modulator is capable of selectively reflecting portions of the first cone of light in an ON direction and the second spatial light modulator is capable of selectively reflecting portions of the second cone of light in an ON direction. The display system further includes a combining device for combining the selectively reflected portions of the cones of light in the ON direction and projection optics for projecting the combined reflected cones of light.

46 Claims, 6 Drawing Sheets

U.S. PATENT DOCUMENTS

| | | | |
|---|---|---|---|
| 5,011,277 A | 4/1991 | Ogino et al. | |
| 5,085,495 A | 2/1992 | Iwahara et al. | |
| 5,086,341 A | 2/1992 | Tamada et al. | |
| 5,116,117 A | 5/1992 | Miyashita | |
| 5,153,621 A | 10/1992 | Vogeley | |
| 5,382,990 A | 1/1995 | Hath et al. | |
| 5,386,253 A | 1/1995 | Fielding | |
| 5,400,093 A | 3/1995 | Timmers | |
| 5,490,009 A | 2/1996 | Venkateswar et al. | |
| 5,555,035 A | 9/1996 | Mead et al. | |
| 5,612,753 A | 3/1997 | Poradish et al. | |
| 5,668,611 A | 9/1997 | Ernstoff et al. | |
| 5,737,124 A * | 4/1998 | Sarayeddine | 359/487 |
| 5,796,442 A | 8/1998 | Gove et al. | |
| 5,809,182 A | 9/1998 | Ward et al. | |
| 5,844,663 A | 12/1998 | Holley et al. | |
| 5,847,784 A | 12/1998 | Finnila et al. | |
| 5,865,520 A | 2/1999 | Kavanagh et al. | |
| 5,902,030 A | 5/1999 | Blanchard | |
| 5,956,000 A | 9/1999 | Kreitman et al. | |
| 5,988,817 A | 11/1999 | Mizushima et al. | |
| 5,990,982 A | 11/1999 | Gove et al. | |
| 6,017,123 A | 1/2000 | Bleha et al. | |
| 6,128,131 A | 10/2000 | Tang | |
| 6,193,375 B1 | 2/2001 | Nagata et al. | |
| 6,222,593 B1 | 4/2001 | Higurashi et al. | |
| 6,276,801 B1 | 8/2001 | Fielding | |
| 6,542,179 B1 * | 4/2003 | Kurtz et al. | 348/97 |

FOREIGN PATENT DOCUMENTS

| | | |
|---|---|---|
| EP | 0 751 683 | 1/1997 |
| EP | 0 786 687 A1 | 7/1997 |
| EP | 0961 502 A2 | 12/1999 |
| FR | 2 774 481 | 8/1999 |
| GB | 2352836 A | 2/2001 |
| WO | WO 95/25292 | 9/1995 |
| WO | WO 96/04582 | 2/1996 |
| WO | WO 00/54096 | 9/2000 |
| WO | WO 00/76210 A1 | 12/2000 |
| WO | WO 01/41455 | 6/2001 |

OTHER PUBLICATIONS

Chen and Johnson, "Fundamentals of Scalable High Resolution Seamlessly Tiled Projection System," *Proc. SPIE*, vol. 4294:67–74 (2001).

Patent Abstracts of Japan, vol. 1995, No. 08, Sep. 29, 1995 & JP 07 134275 A (Mitsubishi Electric Corp), May 23, 1995 abstract.

Patent Abstracts of Japan, vol. 013, No. 587 (P-983) Dec. 25, 1989 & JP 01 251081 A (Toshiba Corp) Oct. 6, 1989.

Takahashi, et al., "A Highly Realistic Video Display Based on the Interleave Projection Method," *NTT Review*, 5(6):66–68 (Nov. 1993).

* cited by examiner

METHODS AND SYSTEMS FOR LOW LOSS SEPARATION AND COMBINATION OF LIGHT

CROSS-REFERENCE TO RELATED APPLICATIONS

This application claims priority to U.K. provisional application Serial No. 0009590.1, filed Apr. 18, 2000, U.S. provisional application No. 60/198,614 filed on Apr. 20, 2000, and International Application No. PCT/US01/12613 filed on Apr. 18, 2001, the entire contents of which are incorporated herein by reference.

FIELD OF THE INVENTION

The field of the invention is image projection in general, and electronic image projection in particular.

BACKGROUND

U.S. Pat. No. 5,386,253 to Fielding, incorporated herein in its entirety by this reference, discusses exemplary projection systems utilizing one or more spatial light modulators (SLMs). As noted in the Fielding patent:

> Spatial light modulator devices include so-called "active matrix" devices, comprising an array of light modulating elements, or "light valves," each of which is controllable by a control signal (usually an electrical signal) to controllably reflect or transmit light in accordance with the control signal. A liquid crystal array is one example of an active matrix device; another example is the deformable mirror device (DMD) developed by Texas Instruments . . . .

See Fielding, col. 1, ll. 13–21. Of course, yet other types of light "engines," or sources, and projectors exist, and various of them may be used in connection with the inventions described herein.

Regardless of the type of projector used, audiences frequently desire to see images high in detail and richness and low in objectionable artifacts. High resolution and image quality in particular facilitates suspension of disbelief of an audience as to the reality of the projected images. Such quality indeed often is an important factor in the overall success of the motion picture viewing experience among today's audiences.

Providing high resolution images to audiences can be prohibitively expensive in terms of producing the software, and in terms of the hardware necessary to show high resolution images. Imax Corporation, for example, the intended assignee of this application, utilizes not only specialized cameras and projectors, but also seventy millimeter, fifteen perforation film to increase the resolution and quality of projected images.

In some venues, it is desirable to be able to display high resolution moving picture images that are non-film based, such as computer generated graphics, or material captured with electronic cameras. It is particularly prohibitive to display these kinds of high resolution images using conventional electronic projectors (and especially those utilizing SLMs) because it is not technically or economically feasible to produce the necessary spatial light modulators (SLM) at sufficient resolution to match the high resolution of the source material. As well, such electronic projectors frequently fail to furnish the dynamic range and overall brightness of images provided by large-format films.

One approach for displaying high resolution images using electronic projectors is to use a number of smaller display devices arranged so that each individual device projects a portion of the total image. This is the principle behind so-called video walls, which feature a matrix of CRT displays, each one displaying only a subset of a high resolution image. This approach is commonly referred to as display tiling. Another approach is to combine or superimpose two or more sub-images by offsetting individual SLMs by 1/z of a pixel, so that the pixels of one spatial light modulator are positioned to lie between the spaces of the pixels of another SLM. This approach is discussed in U.S. Pat. No. 5,490,009.

While tiling can be accomplished using multiple projection systems, each having a light source, SLM and projection lens, in order to provide the most satisfactory tiling of images, and to accomplish superimposition where very high accuracy of image alignment is needed, it is desirable to combine the multiple SLMs into a single projection apparatus. However, it is also desirable for some components such as the light source and projection lens to be shared. Sharing the light source is desirable because a single light source can typically illuminate a larger solid angle than can be coupled into a single SLM. Sharing of projection lenses is further desirable in order to minimize variations in the image quality produced by multiple SLMs by reducing the number of optical components. In order to do this a means is required to efficiently sub-divide the light from the source and to recombine the output of the multiple SLMs prior to the projection lens. This invention provides systems and methods which enable high efficiency in distributing light from a single source to multiple SLMs and recombining the modulated light for projection onto a screen.

SUMMARY OF THE INVENTION

The invention separates the light produced by a projection lamp into two discreet and essentially equal channels and then recombines them after modulation by SLMs. In the act of separating the light, a distinct intensity distribution is imposed on each channel and acts as a label for future recombination. The light in each channel carries on to uniformly illuminate each SLM surface. After modulation, means which rely on the labeling mentioned above recombine the two separate channels into one prior to passage through projection optics.

In one embodiment, light from a projection lamp is directed into a rectangular integrating bar and is then split into two complementary half cones of light intensity distribution by the use of a total internal reflection (TIR) prism after the integrating bar. Each half cone of light is then directed by the relay optics to a SLM where it is modulated in accordance with stored image information. The SLMs may be offset or tiled with respect to each other to increase the effective resolution of the projection apparatus. After modification by the SLMs the two beams are recombined using a second TIR prism. In another embodiment, separation is accomplished by a beam splitter positioned at the pupil of a telecentric relay. Similarly, the images of the two SLMs may be combined using a second telecentric relay (with the entrance pupil at infinity) with a second beam splitter positioned at a pupil or focal plane of the second relay. The illumination distribution at the pupils is directly related to the intensity distribution at the image and object planes.

The beam splitter combining element can have surface features with both reflecting mirrored portions and transparent portions, in approximately equal proportions. The mirrored and reflecting portions may be distributed in a number of possible patterns. An additional benefit of the invention is that for recombining the modulating light some patterns, for example a checkerboard pattern, allow the combining element to act as a spatial filter and remove to some degree high frequency spatial information, which contributes to image pixellation.

DETAILED DESCRIPTION

Figure 1:
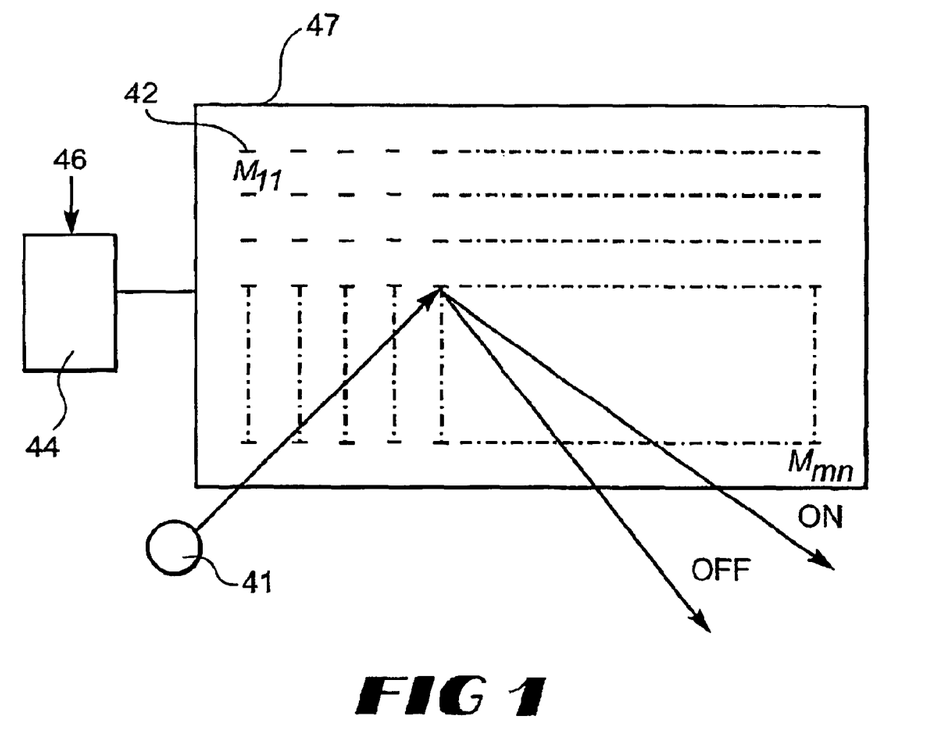
FIG. 1 is a schematic illustrating the operation of a spatial light modulator.

Referring first to FIG. 1, there is illustrated a spatial light modulator (SLM) 47 having an M×N array of pixels 42 arranged in rows and columns. A light beam 41 is directed at the SLM 47 and light is reflected off or transmitted by the pixels 42 in an ON direction or an OFF direction. SLM 47 could be a deformable mirror device (DMD), such as that sold by Texas Instruments, in which each of the pixels is actually a micro-steerable mirror that can be toggled between an off-state and an on-state in rapid succession, as is necessary to display an image on a projection screen. SLM 47 is connected to a driver circuit 44 that receives an electronic signal from a control circuit indicated generally as 46 and addresses each of the pixels. Alternatively, SLM 47 could be a liquid crystal array.

Figure 2:
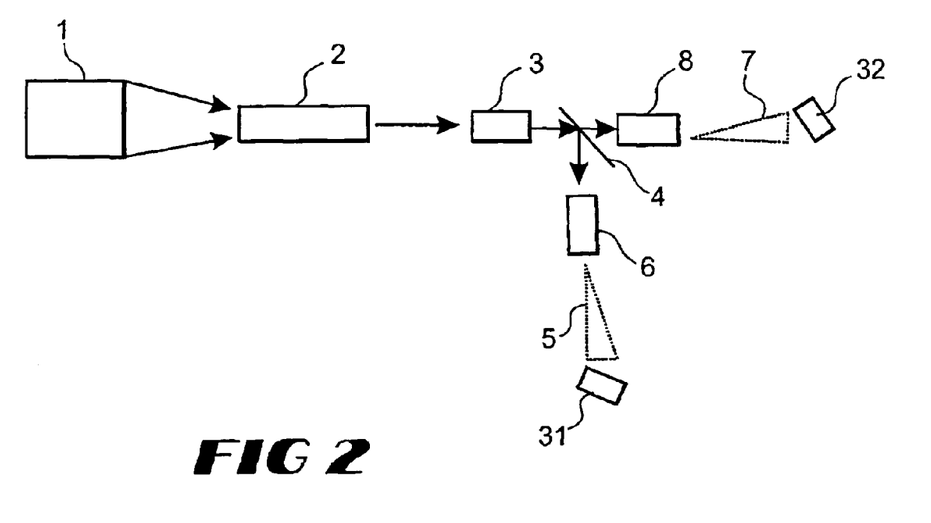
FIG. 2 is a schematic illustrating the method of separating the light by means of a knife edge mirror.

In FIG. 2, light produced by a projection lamp 1 is directed toward a rectangular integrating bar 2, which serves the purpose of providing a beam of light with a rectangular profile matching that of the spatial light modulators (SLMs) of the projection device. Integrating bar 2 also serves to redistribute the light to produce a beam having a more uniform intensity distribution than that entering the integrating bar. The light is directed to an illumination relay system consisting of front end relay optics 3 and back end relay optics 6 and 8. The illumination relay optics are designed so that the output will be telecentric (exit pupil at or near infinity) in order to provide the most uniform distribution of light to the SLMs. Maintaining consistent illumination angles over the field is particularly important for color systems that employ dichroic mirrors in combination with multiple SLMs to modulate the input light in color components (RGB). The relay is split into two parts to allow location of a knife edge mirror 4 at the pupil of the relay optics. The knife edge mirror 4 divides the illumination at the pupil into two symmetrical cones of light and reflects the first cone to first back end relay optics 6 and allows the second cone to be transmitted to second back-end relay optics 8. The first back end relay optics 6 transmits the first cone of light 5 to a first SLM 31 and the second back end relay optics 8 transmits the second cone of light 7 to a second SLM 32. Knife edge mirror 4, may in fact be a beam splitter cube with one half of its internal surface mirrored. The two half cones will have complementary intensity distributions which can be exploited to achieve high efficiency recombination.

Figure 3:
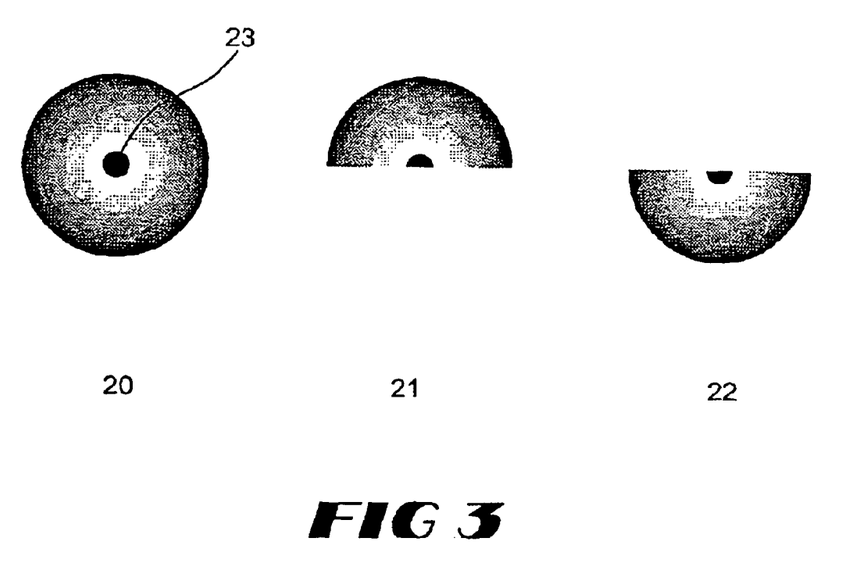
FIG. 3 is a schematic illustrating an exemplary distribution of a light beam and two cones of light according to the method of FIG. 2.

FIG. 3 illustrates an exemplary light distribution for a beam of light and two half cones of light according to the system of FIG. 2. Here the distribution of light at the pupil might be as shown at 20. The hole in the center 23 is due, for example, to the characteristics of the light source (a collection mirror with a hole at the center to clear a lamp electrode). The knife edge 4 acts to split the distribution of the light at the pupil into two symmetrical distributions shown at 21 and 22. The outputs of the back end relay optics 6 and 8 are ½ cones of light 5 and 7 respectively which telecentrically illuminate two SLM devices.

While the preferred embodiment discloses splitting the light beam into two cones of light, it will be appreciated by those of skill in the art that the light beam could be split into multiple cones of light for multiple SLMs.

Figure 4:
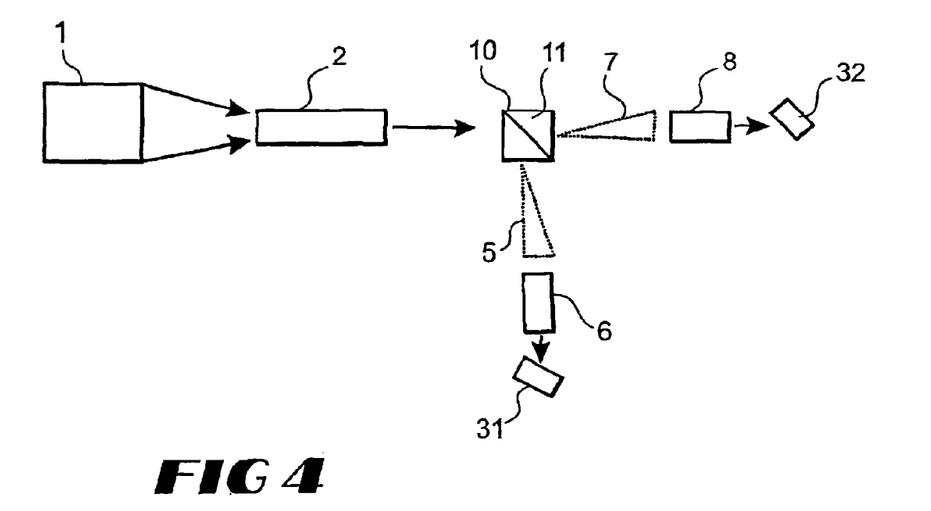
FIG. 4 is a schematic illustrating the method of separating the light by means of a total internally reflecting (TIR) prism.
Figure 5:
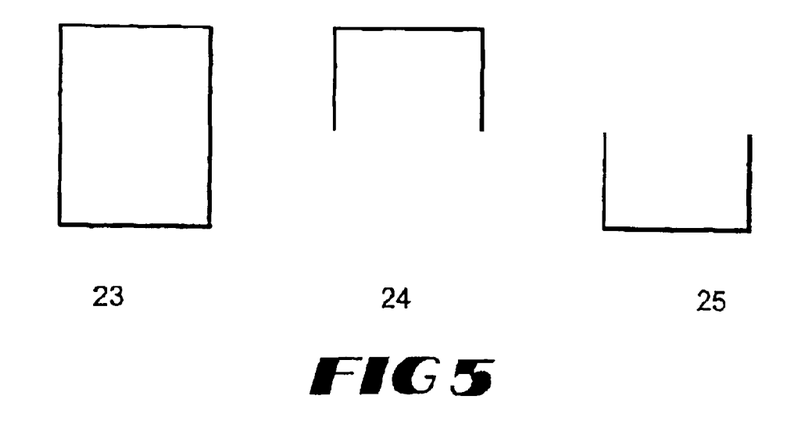
FIG. 5 is a schematic illustrating an exemplary distribution of a light beam and two cones of light according to the method of FIG. 4.

In FIG. 4, the output of a projection lamp 1 is directed toward a rectangular integrating bar 2 which serves the same purpose described above. The light emerging from 2 is then directed toward a total internal reflection (TIR) prism 10. TIR 10 is designed to transmit light rays at angles less than 45 degrees to its boundary surface 11 and to reflect light rays at angles greater than 45 degrees. By suitably arranging the angles of incidence in each light path, the TIR prism divides the larger light cone of light from the integrating bar into to ½ cones. This effect is similar to that obtained by the method of using a knife-edge mirror at the pupil as described above. However, in the case of the knife edge mirror located at a pupil the resulting illumination distribution in each ½ cone is the same as the original overall input illumination distribution. In the case of the TIR prism 10 the illumination distribution is actually a symmetrical ½ of the distribution of the total. Referring now to FIG. 5, the use of TIR allows the output of the integrating bar 23 to be divided into two complimentary and symmetrical distributions 24 and 25 without requiring the splitting zone to be at a focal plane, eliminating the need for the front end relay optics. Referring again to FIG. 4, the two half cones of light from the TIR prism are converted to telecentric illumination for the SLMs 31 and 32 by relay optics 6 and 8.

Figure 6:
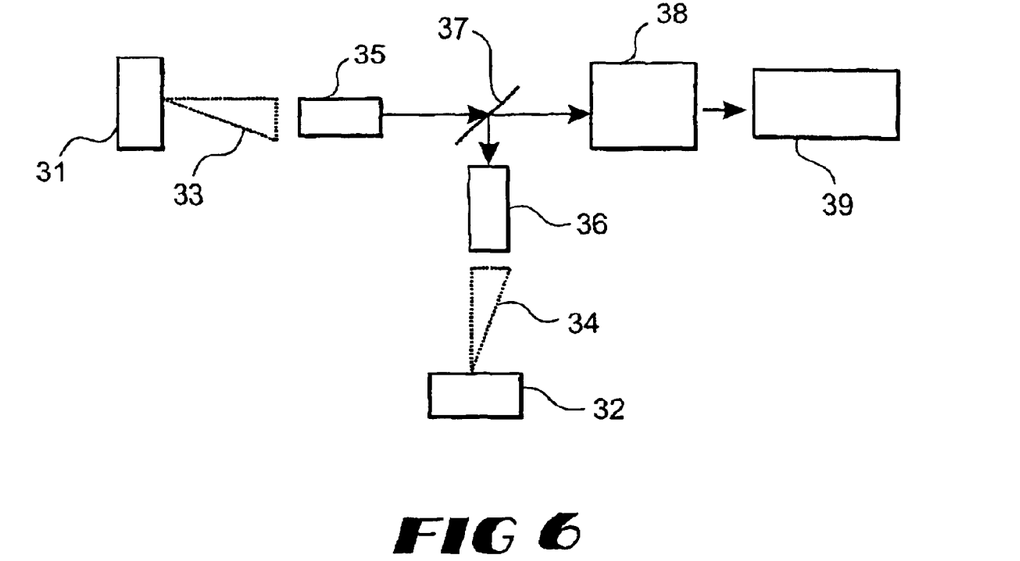
FIG. 6 is a schematic illustrating focal plane recombination.

FIG. 6 illustrates how the light from two SLM devices illuminated by the light splitting system of FIG. 2 is re-combined in a relay system that is essentially the inverse of that used to split the light. That is, it is a telecentric relay with the entrance pupil located at infinity. Again, this relay is split into two parts, front end parts 35 and 36, and back end part 38 so that a second knife edge or partial beam splitter can be located at a focal plane in the relay. In FIG. 6, a first half-cone of light 33 is reflected from the surface of a surface light modulator (SLM) 31 and is directed through first front-end relay optics 35. A second half cone of light 34 is reflected from the surface of a second SLM 32, and is directed toward second front-end relay optics 36. The half cone intensity distribution at the SLM manifests itself as an illumination distribution at the pupil which is located at the beam splitter 37. The beam splitter 37 can be a beam splitter cube with one half of its internal surface mirrored. The beam splitter 37 allows low loss combination by reflecting all the light, in the ON direction, from SLM 32 and transmitting all of the light, in the ON direction, from SLM 31. The combined beam passes through the back end of the relay optics 38 prior to passage through projection optics 39. The combined beam is projected by the projection optics 39 onto a screen (not shown).

Figure 7:
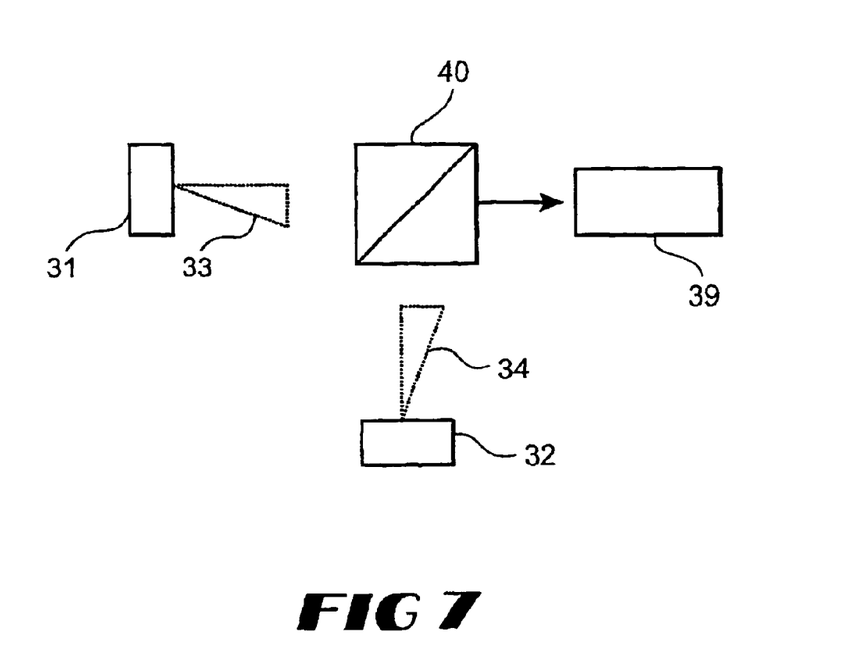
FIG. 7 is a schematic illustrating TIR recombination.

FIG. 7 similarly illustrates how the light split by the TIR prism in FIG. 4 and directed to two SLMs is re-combined. In FIG. 7, a TIR prism 40 combines the two half cones of light 33 and 34 reflected, in the ON direction, from the surfaces of SLMs 31 and 32 respectively. The combined light is directed towards projection optics 39. This arrangement has the advantage of not requiring optics between the SLMs and the combining element since the TIR method does not require a focal plane for performing the combination and thus does not suffer from concerns of having matching optical elements, as is the case in the embodiment of FIG. 6.

Figure 8:
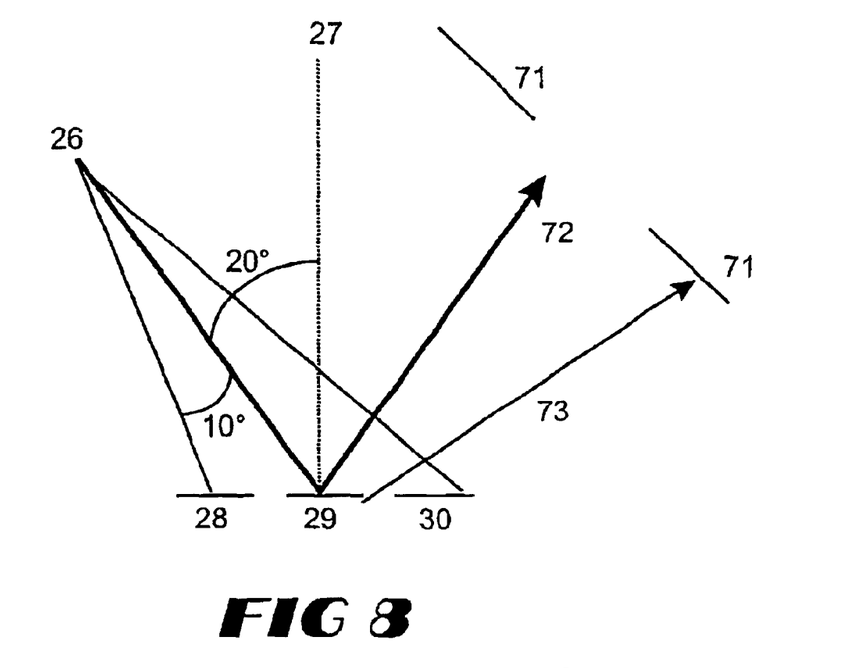
FIG. 8 is a schematic illustrating the incident angles of light in relation to a DMD.

A secondary benefit of these systems and methods of light separation and combination is an improvement in system contrast due to the smaller pupil each SLM sees. The smaller pupil reduces the amount of light scattering within the projecter and leads to an improvement in contrast. In addition, the distribution of scattered light at the pupil is generally not uniform, and by suitable positioning of the recombining relay optics with respect to the knife edge or beam splitter located at the pupil one can reduce the amount of scattered light that propagates through the rest of the system. This can result in a contrast improvement. For DMDs, in particular, improvements may also be realized by orienting the illuminating half cones with respect to the surface of the DMDs so that the average incident angle is maximized. Referring now to FIG. 8, principle ray 26 of the illuminating light strikes DMD mirrors 28, 29 and 30 at an angle of 20 degrees with respect to a normal 27 to the mirror plane. As shown in FIG. 8 the illuminating cone around principle ray 26 consists of rays +/−10 degrees either side of this principle ray. Specular reflection of the desired imaging light will occupy a range of angles about the principle reflected ray 72. Only the desired image rays should enter the aperture 71 of the output relay or projection lens. If the angular relationship of this aperture 71 is correct with respect to principle ray 26 and the accompanying cone of light, then scattered rays such as those reflected from the substrate below the mirrors like 73 will not enter the aperture 71 of the output relay or projection lens. This helps to ensure that any unwanted reflections from the DMD, which may contribute to reducing contrast on the screen, will be directed away from the projection axis of the system.

Figure 9:
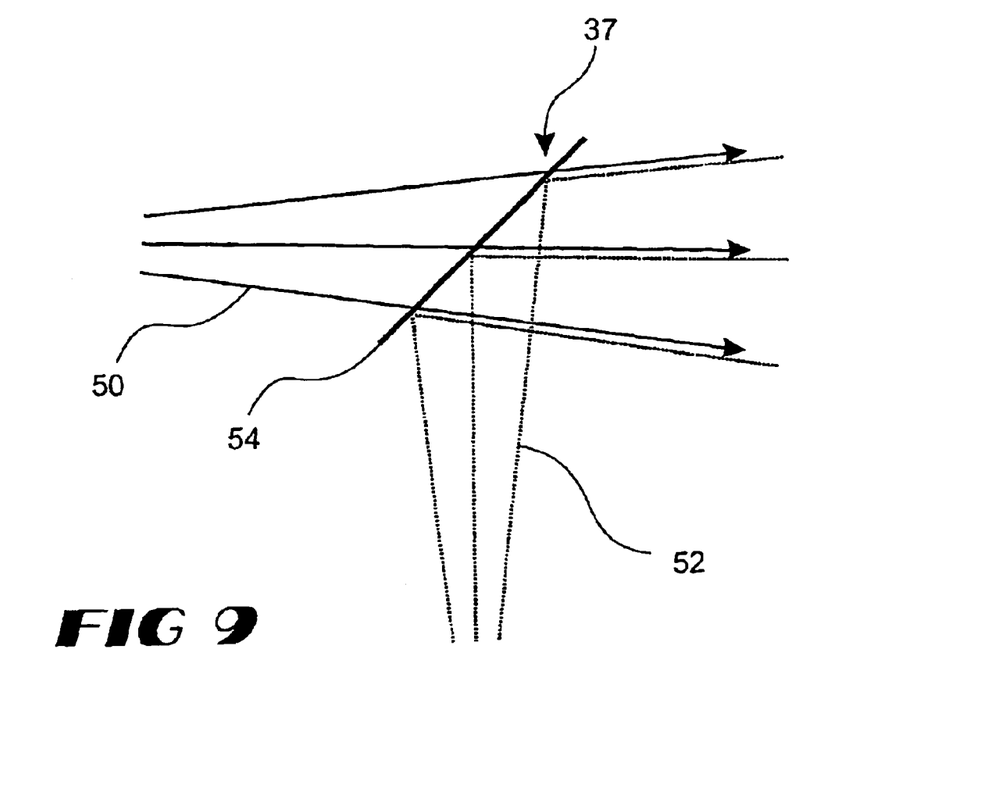
FIG. 9 is a schematic illustrating the combination of two separate images.

The beam splitter 37 used with the embodiments illustrated and described with respect to FIG. 6 for the recombination of the two half cones may be formed in a number of possible patterns of reflective and transparent portions. For example, FIG. 9 illustrates schematically the combination of two separate images 50 and 52 using the combining element 37, which has both mirrored portions and transparent portions in substantially equal portions. Image light 50, from a first SLM, passes through the transparent portions of combining element 37, whereas image light 52, from a second SLM is reflected off of the mirrored portions of the combining element. The two SLMs may be offset from each other by ½ pixel, horizontally, vertically or both to increase the apparent resolution of the images on the screen. Combining element 37 is located at an intermediate plane within the relay optics of the projector, and is preferably located at the pupil of said relay optics. Similarly, a beam splitter element 4 with mirrored portions and transparent portions in equal proportions could be used.

Figure 10:
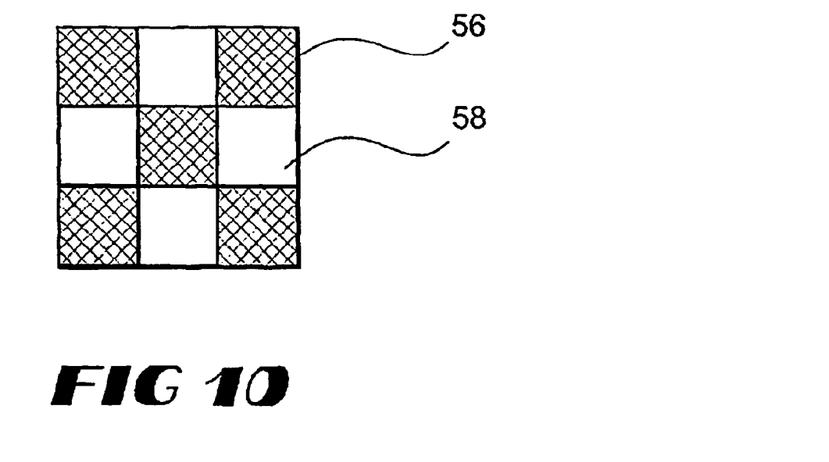
FIG. 10 illustrates a checkerboard pattern of mirror distribution.
Figure 11:
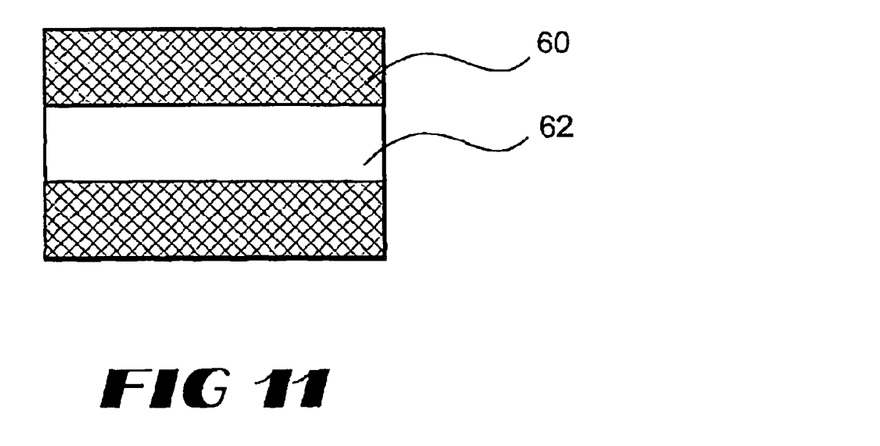
FIG. 11 illustrates an alternative embodiment in which the mirror pattern is a number of longitudinal strips.
Figure 12:
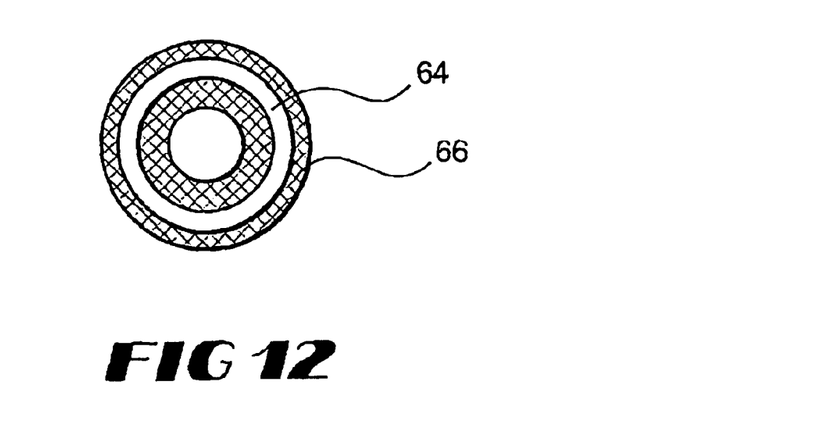
FIG. 12 illustrates an alternative embodiment in which the mirror pattern is a series of concentric circles.

FIGS. 10–12 illustrate different possible patterns of mirror portions 56, 60, 66, and transparent portions 58, 62, 64. The combining element or splitter element can be manufactured as a standard beam splitting cube, with the mirror pattern(s) deposited on the diagonal plane of the cube. FIGS. 10, 11, and 12 illustrate a checkerboard pattern, a longitudinal strip pattern, and a concentric circular pattern respectively and are examples of some possible mirror patterns. Other patterns exist, which are also effective.

An additional benefit of using the inventive method of beam combination is that some mirror-portion patterns may act as a spatial filter to remove unwanted higher spatial frequencies associated with the edges of pixels. The checkerboard pattern illustrated in FIG. 10 is one such pattern. It breaks the cross section of a light beam down into a set of small apertures, each of which passes a narrow bandwidth of spatial frequencies and subsequently removes high spatial frequency information. In the case of incoherent illumination, the bandwidth of the entire system is equal to that of each individual smaller aperture. Experiments have shown that changing the size of the squares in a checkerboard pattern changes the filtering characteristics, allowing one to select an optimal mirror pitch for each particular system.

This system may also be implemented for a three color projection system where typically three SLMs are used per channel, one for modulation each of red, green and blue light. Here it is common to use a color splitting and combining prism employing TIR and dichroic mirrors. In the foregoing descriptions, each of the single SLMs could be replaced by such a prism, each having three SLMs for modulation of red, green and blue light. The corresponding light source of course requires the appropriate spectral distribution, and the associated relay optics or TIR beam splitters must be designed to minimize chromatic aberrations. A three color projection system is generally described in U.S. Pat. No. 5,865,520, which is incorporated herein in its entirety by this reference.

The foregoing is provided for purposes of explanation and disclosure of preferred embodiments of the present invention. For instance, a preferred embodiment of this invention involves using two deformable mirror devices as the spatial light modulators. It is expected that such capabilities or their equivalent will be provided in other standard types of spatial light modulators and that more than two spatial light modulators could be used, in which case the preferred embodiment of this invention may be easily adapted for use in such systems. Further modifications and adaptations to the described embodiments will be apparent to those skilled in the art and may be made without departing from the scope or spirit of the invention and the following claims.

What is claimed is:

1. A method comprising:
    integrating a light beam from a light source;
    splitting the integrated light beam at a first location into at least a first cone of light and a second cone of light, wherein the first cone of light has a first intensity distribution and the second cone of light has a second intensity distribution that is complimentary to the first intensity distribution;
    directing the first cone of light onto a first spatial light modulator and directing the second cone of light onto a second spatial light modulator;

modulating the first cone of light by the first spatial light modulator to create a third cone of light and modulating the second cone of light by the second spatial light modulator to create a fourth cone of light;

combining the third cone of light and the fourth cone of light at a second location into combined light, wherein the second location is separate from the first location; and projecting the combined light.

2. The method of claim 1, wherein the third cone of light has the first intensity distribution and the fourth cone of light has the second intensity distribution.

3. The method of claim 1 wherein the light beam is integrated using an integrator rod.

4. The method of claim 1 where the integrated light beam is split-into a first cone of light and a second cone of light using a spatial beam splitter.

5. The method of claim 4 wherein the spatial beam splitter is a beam splitter cube.

6. The method of claim 4 wherein the spatial beam splitter has mirror portions and transparent portions distributed substantially equally.

7. The method of claim 4 wherein the spatial beam splitter is a knife edge mirror.

8. The method of claim 4 wherein the spatial beam splitter has mirror portions and transparent portions distributed substantially equally in a checkerboard pattern.

9. The method of claim 4 wherein the spatial beam splitter has mirror portions and transparent portions distributed substantially equally in a longitudinal strip pattern.

10. The method of claim 4 wherein the spatial beam splitter has mirror portions and transparent portions distributed substantially equally in a concentric circular pattern.

11. The method of claim 1 wherein the integrated light beam is split into the first and second cones of light using total internal reflection prism.

12. The method of claim 1 wherein the third and fourth cones of light are combined using a spatial beam splitter.

13. The method of claim 12 wherein the spatial beam splitter is a beam splitter cube.

14. The method of claim 12 wherein the spatial beam splitter has mirror portions and transparent portions distributed substantially equally.

15. The method of claim 12 wherein the spatial beam splitter has mirror portions and transparent portions distributed substantially equally in a checkerboard pattern.

16. The method of claim 12 wherein the spatial beam splitter has mirror portions and transparent portions distributed substantially equally in a longitudinal strip pattern.

17. The method of claim 12 wherein the spatial beam splitter has mirror portions and transparent portions distributed substantially equally in a concentric circular pattern.

18. The system of claim 12 wherein the spatial beam splitter is a knife edge mirror.

19. The method of claim 1 wherein the third and fourth cones of light are combined using a total internal reflection prism.

20. The method of claim 1 wherein the spatial light modulator is a liquid crystal array.

21. The method of claim 1 wherein the spatial light modulator is a deformable mirror device.

22. A display system, comprising:
a light source;
an integrator rod for receiving a light beam from the light source and producing an integrated light beam;
a beam splitting device in a first location for splitting the integrated light beam into at least a first cone of light having a first intensity distribution and a second cone of light having a second intensity distribution; wherein the first intensity distribution is complementary to the second intensity distribution at least a first spatial light modulator and a second spatial light modulator, wherein the first spatial light modulator is capable of selectively modulating portions of the first cone of light in an ON direction to create a third cone of light and the second spatial light modulator is capable of selectively modulating portions of the second cone of light in an ON direction to create a fourth cone of light;

a combining device in a second location for combining the third cone of light and the fourth cone of light into combined light, wherein the first location is separate from the second location and the beam splitting device is separate from the combining device; and and projection optics for projecting the combined light.

23. The system of claim 22, wherein the third cone of light has the first intensity distribution and the fourth cone of light has the second intensity distribution.

24. The system of claim 22 further comprising front end relay optics for receiving the integrated light beam and transmitting the integrated light beam to the beam splitting device.

25. The system of claim 24 wherein the beam splitting device is a spatial beam splitter.

26. The system of claim 25 wherein the spatial-beam splitter is a beam splitter cube.

27. The system of claim 25 wherein the spatial beam splitter has mirror portions and transparent portions distributed substantially equally.

28. The system of claim 25 wherein the spatial beam splitter is a knife edge mirror.

29. The system of claim 25 wherein the spatial beam splitter has mirror portions and transparent portions distributed substantially equally in a checkerboard pattern.

30. The system of claim 25 wherein the spatial beam splitter has mirror portions and transparent portions distributed substantially equally in a longitudinal strip pattern.

31. The system of claim 25 wherein the spatial beam splitter has mirror portions and transparent portions distributed substantially equally in a concentric circular pattern.

32. The system of claim 22 further comprising:
a first back end relay optics for receiving the first cone of light and transmitting the first cone of light to the first spatial light modulator; and
a second back end relay optics for receiving the second cone of light and transmitting the second cone of light to the second spatial light modulator.

33. The system of claim 22 further comprising:
a first front end relay optics for receiving the third cone of light and transmitting the third cone of light; and
a second front end relay optics for receiving the fourth cone of light and transmitting the fourth cone of light.

34. The system of claim 33 wherein the combining device is a spatial beam splitter.

35. The system of claim 34 wherein the spatial beam splitter is a beam splitter cube.

36. The system of claim 34 wherein the spatial beam splitter has mirror portions and transparent portions distributed substantially equally.

37. The system of claim 34 wherein the spatial beam splitter has mirror portions and transparent portions distributed substantially equally in a checkerboard pattern.

38. The system of claim 34 wherein the spatial beam splitter has mirror portions and transparent portions distributed substantially equally in a longitudinal strip pattern.

39. The system of claim 34 wherein the spatial beam splitter has mirror portions and transparent portions distributed substantially equally in a concentric circular pattern.

40. The system of claim 34 wherein the spatial beam splitter is a knife edge mirror.

41. The system of claim 22 wherein the beam splitting device is total internal reflection prism.

42. The system of claim 22 wherein the spatial light modulators are liquid crystal arrays.

43. The system of claim 22 wherein the spatial light modulators are deformable mirror devices.

44. The system of claim 22 wherein the combining device is a total internal reflection prism.

45. The system of claim 22 further comprising a telecentric relay positioned between the integrator rod and the beam splitting device, wherein the beam splitting device is positioned at a pupil of the telecentric relay.

46. The system of claim 22 further comprising a telecentric projection lens, wherein the combining device is positioned at a pupil of the telecentric projection lens.

* * * * *